(12) United States Patent
Ramaswamy et al.

(10) Patent No.: US 7,827,312 B2
(45) Date of Patent: Nov. 2, 2010

(54) METHODS AND APPARATUS FOR TRANSCODING METADATA

(75) Inventors: Arun Ramaswamy, Tampa, FL (US); William A. Feininger, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 953 days.

(21) Appl. No.: 10/540,611

(22) PCT Filed: May 13, 2003

(86) PCT No.: PCT/US03/14970

§ 371 (c)(1), (2), (4) Date: Apr. 13, 2006

(87) PCT Pub. No.: WO2004/061699

PCT Pub. Date: Jul. 22, 2004

(65) Prior Publication Data

US 2006/0242325 A1 Oct. 26, 2006

Related U.S. Application Data

(60) Provisional application No. 60/436,714, filed on Dec. 27, 2002.

(51) Int. Cl.
*G06F 15/16* (2006.01)
(52) U.S. Cl. ........................ 709/246; 709/231
(58) Field of Classification Search .......... 709/246
See application file for complete search history.

(56) References Cited

U.S. PATENT DOCUMENTS

| | | | | |
|---|---|---|---|---|
| 6,088,659 A | * | 7/2000 | Kelley et al. ............ | 702/62 |
| 6,115,654 A | * | 9/2000 | Eid et al. ............... | 701/34 |
| 2001/0031066 A1 | * | 10/2001 | Meyer et al. ............ | 382/100 |
| 2001/0044899 A1 | * | 11/2001 | Levy ..................... | 713/176 |
| 2002/0016969 A1 | * | 2/2002 | Kimble .................. | 725/87 |
| 2002/0138852 A1 | * | 9/2002 | Reynolds et al. ........ | 725/136 |
| 2002/0197063 A1 | * | 12/2002 | Cho ..................... | 386/94 |
| 2003/0055949 A1 | * | 3/2003 | Coulombe et al. ....... | 709/224 |
| 2004/0019690 A1 | * | 1/2004 | Cardno et al. .......... | 709/230 |
| 2004/0064319 A1 | * | 4/2004 | Neuhauser et al. ...... | 704/273 |
| 2005/0138179 A1 | * | 6/2005 | Encarnacion et al. .... | 709/227 |
| 2006/0161635 A1 | * | 7/2006 | Lamkin et al. .......... | 709/217 |
| 2006/0195614 A1 | * | 8/2006 | Sena et al. ............. | 709/246 |

* cited by examiner

*Primary Examiner*—Jeffrey Pwu
*Assistant Examiner*—Shaq Taha
(74) *Attorney, Agent, or Firm*—Hanley, Flight & Zimmerman, LLC

(57) ABSTRACT

A transcoder is adapted to perform transcoding of metadata to enable sharing and consumption of media content at dissimilar devices that are coupled to a home network. The transcoder, which is also coupled to the home network, is adapted to receive media content and metadata from a first media consumption device, to transcode the media content and metadata from a first format to second format, and to supply the transcoded media content and metadata to the second media consumption device in the second format. In one embodiment, the transcoder executes a method by which the transcoder obtains information about the sensing capabilities of a meter adapted to measure media at a media consumption device and subsequently uses that information to transcode the metadata into a format suitable for sensing by the meter.

100 Claims, 8 Drawing Sheets

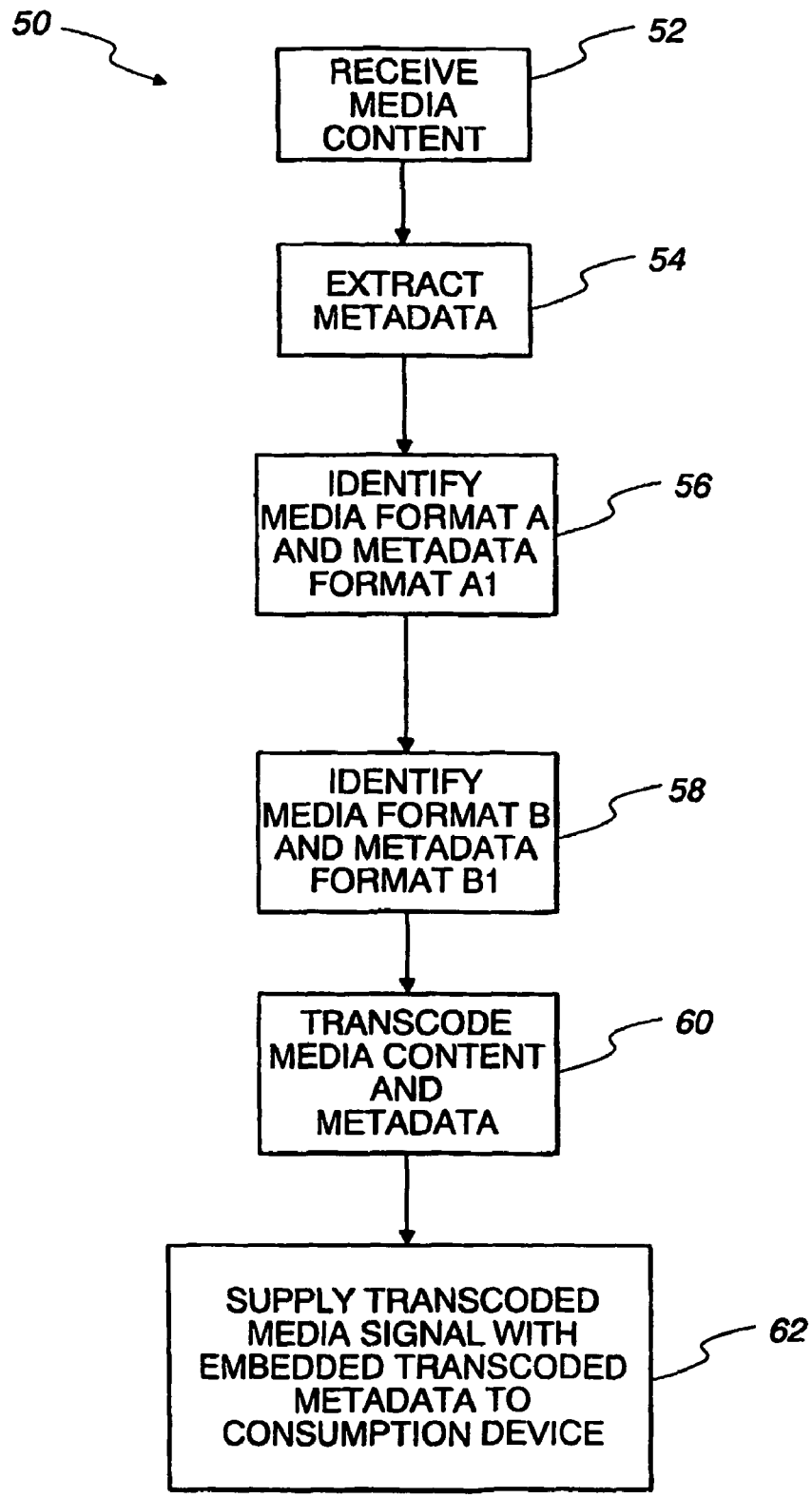

Fig. 5A

| BROADCAST METADATA (FORMAT B1) |
|---|
| Minor Channel Number: 5 |
| Major Channel Number Value: 10 |
| Transport ID: 50 |
| Program Name: "Friends" |
| Program Number: 100 |
| Program Description: "Comedy Sitcom" |
| SourceID: 1001 |
| Date/Time Stamp: 11/21/2002 13:12:50.900 |
| Transport Rate: 19380000 bps |
| Video Bitrate: 5000000 bps |
| Audio Bitrate: 384000 bps |
| Audio Sampling: 48000 Samples/Sec |
| Video Frame Rate: 29.97 |

Fig. 5B

| TRANSCODED METADATA (FORMAT B2) |
|---|
| Program Name: "Friends" |
| Program Number: "1" |
| Program Description: "Transcoded Comedy Sitcom" |
| Source ID: 1001 |
| Broadcast Date/TimeStamp: 11/21/2002 13:12:50.900 |
| Transcoded Date/TimeStamp:12/13/2002 17:42:20.200 |
| Author: "John Doe" |
| DeviceID: 100 |
| HomeID: 25 |
| Format: "Windows Media" |
| Video Bitrate: 100000 bps |
| Audio Bitrate: 32000 bps |
| Audio Sampling: 32000 Samples Per Sec |
| Video Frame Rate: 15 fps |

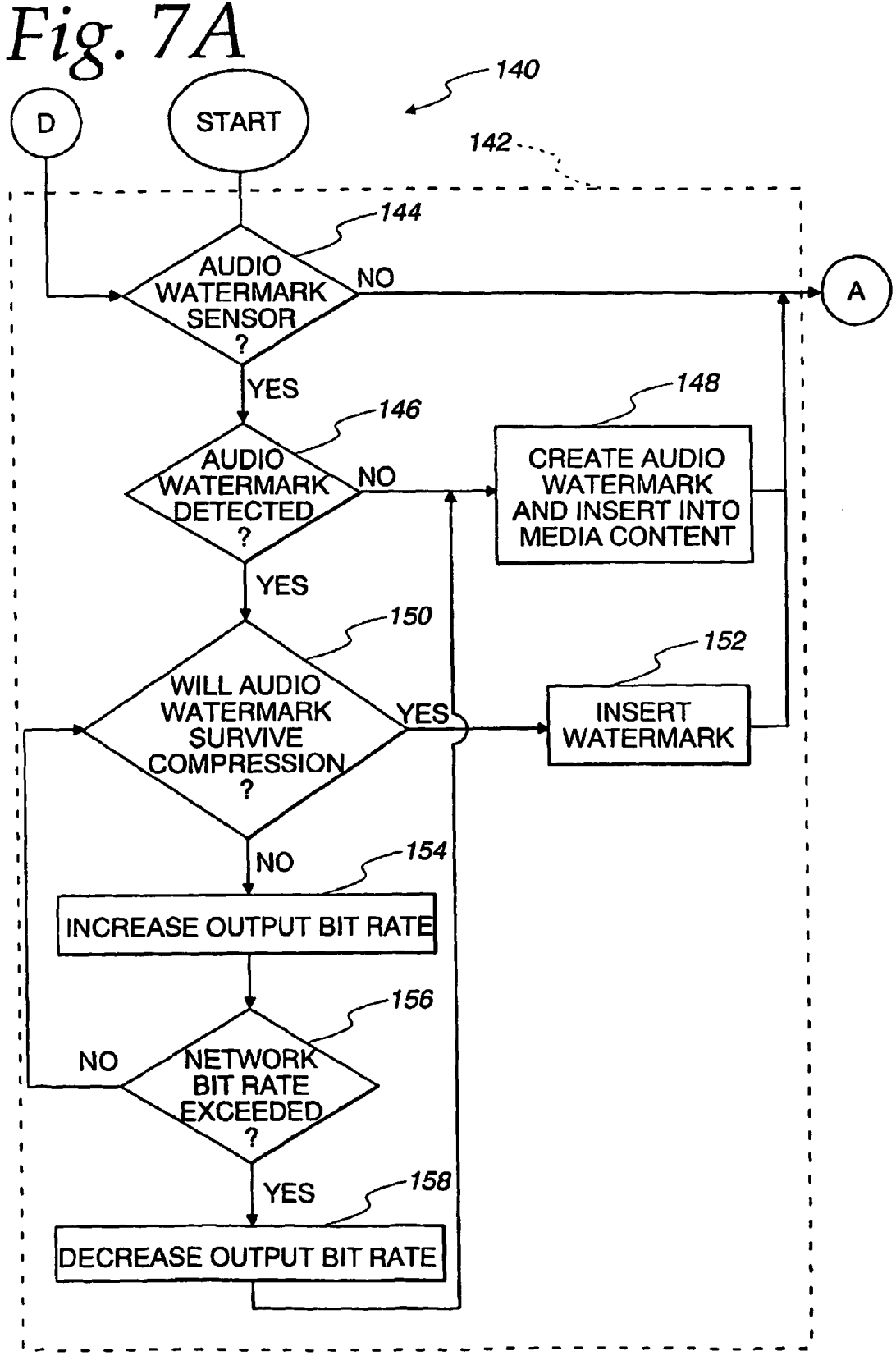

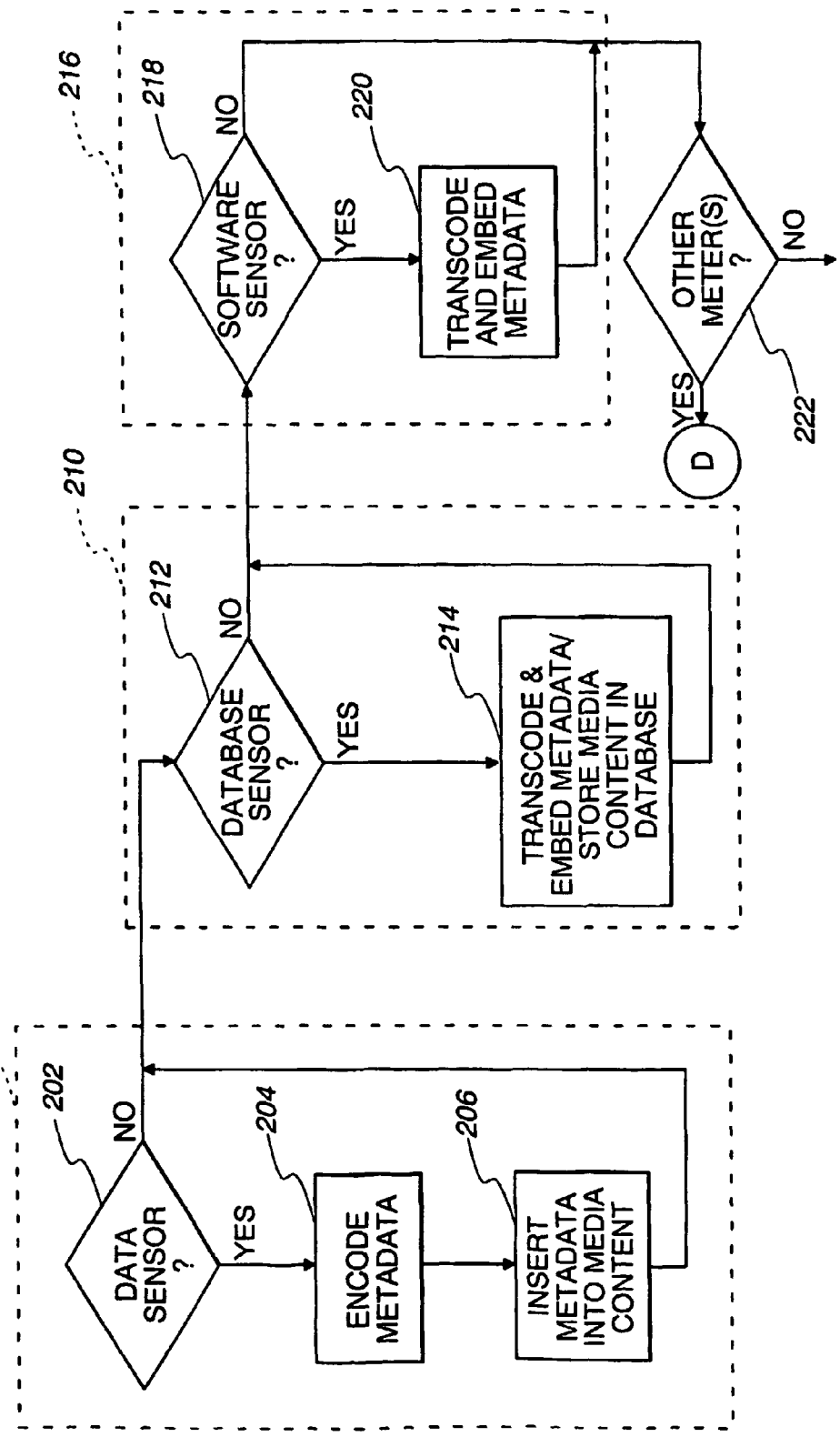

METHODS AND APPARATUS FOR TRANSCODING METADATA

RELATED APPLICATION

This patent application claims priority from U.S. provisional application Ser. No. 60/436,714, filed Dec. 27, 2002.

BACKGROUND

Through the advancement of technology, media content is finding its way into homes by various non-traditional means. For instance, with the advent of broadband data connections, media content is now being supplied to homes via the Internet and other digital distribution sources as well as the traditional means of television and radio broadcasts. In addition, home networking standards such as HAVi and wired and wireless protocols such as IEEE 1394, IEEE 802.11, ultra wide band (UWB), cellular and pager networks and Bluetooth now allow a variety of different media consumption devices to communicate via a home network. Thus, media content received at a home can be distributed via a home network for display on any of the media consumption devices connected to the home network.

These advancements in home networking and media content delivery mechanisms provide users with enhanced access to media content, but also present new challenges for measuring the consumption of media content. More specifically, conventional media consumption meters are typically configured to measure media signals consumed in a particular format by a specific type of media consumption device. For example, television content consumption is measured using meters adapted to measure signals formatted for television. Likewise, computer content consumption is measured using meters adapted to measure signals formatted for a computer. Although this approach works well for media consumption devices that are not networked together, it does not allow for media consumption measurement in a home networked environment because of the manner in which media content is transmitted via a home network. Specifically, a home network typically comprises a variety of media consumption devices that are networked together and that are each adapted to process media provided in a particular format. To enable communication between the networked devices, home networks include one or more transcoders that transcode or convert media content signals transmitted via the home network between the various signal formats required by the networked devices. For example, a typical home network may be configured to include a television coupled to a computer with a transcoder disposed between the television and the computer. Media content that is received at the television and then selected for viewing at the computer is converted by the transcoder from a television format to a computer format so that the media content received at the television can be processed for display/viewing at the computer.

Unfortunately, the format conversion process performed by home network transcoders to enable communication between dissimilar devices also causes the corruption or loss of valuable audience measurement data. More specifically, data that enables media consumption measurement is embedded into media content by media content providers. The data is then extracted by media content consumption meters for use in determining the identity of the media content as well as other information about the media content which can then be reported for purposes of measuring consumption of that media content. However, home network transcoders are not adapted to convert this embedded data into a format suitable for use by downstream consumption measuring devices and, as a result, the embedded data is either stripped from the media content or corrupted during the transcoding process. Consequently, consumption of the converted media content cannot be accurately measured.

BRIEF DESCRIPTION OF THE DRAWINGS

FIG. 4 is a flow chart that depicts a method for performing metadata transcoding.

FIG. 5A is a diagram that depicts a set of metadata fields suitable for use with media content provided in a broadcast television format.

FIG. 5B is a diagram that depicts a set of metadata fields suitable for use with media content provided in a streaming media format.

FIGS. 7A-7C are flow charts that align to depict an example method for determining the sensing capabilities of a metering device.

DETAILED DESCRIPTION

Figure 1:
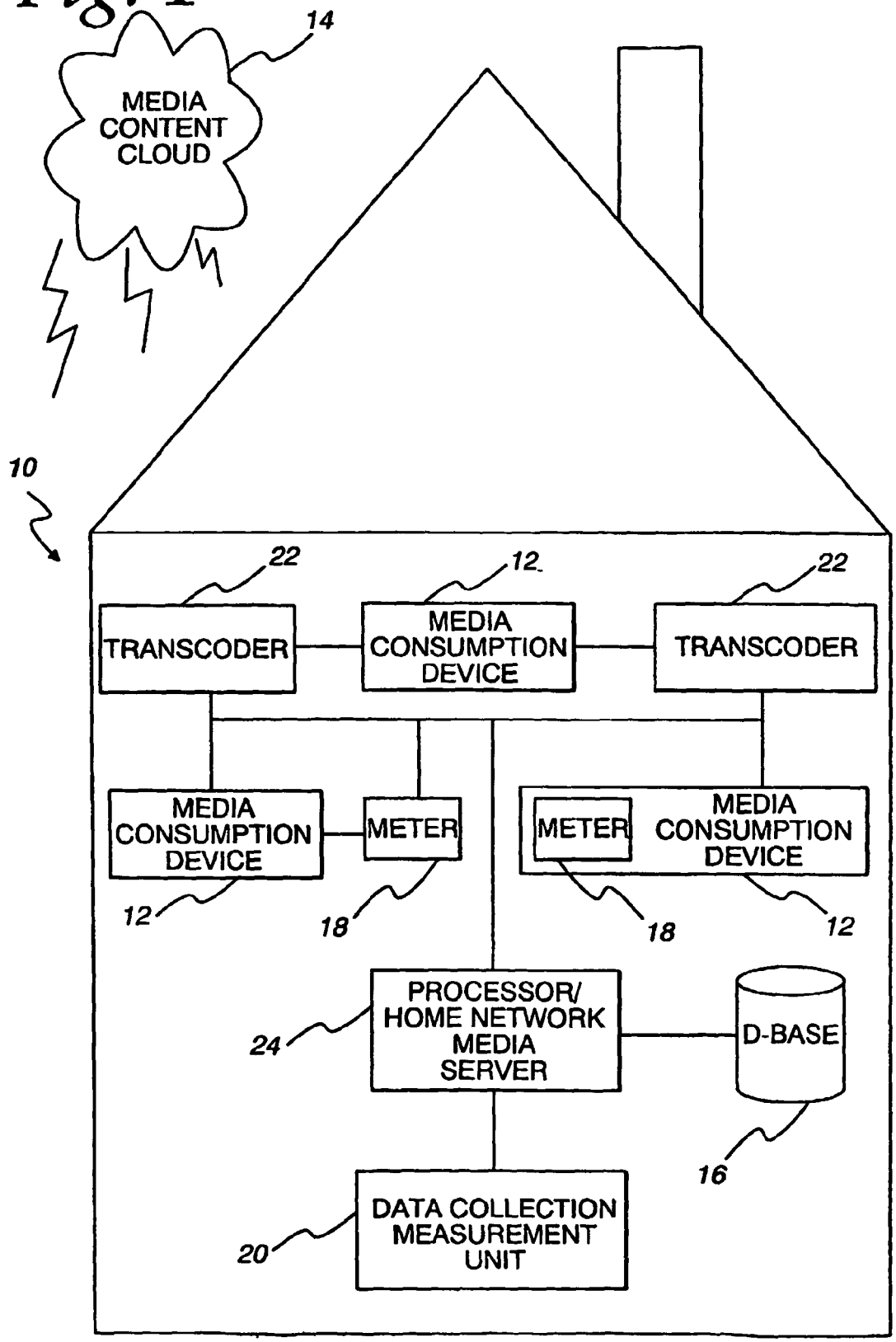
FIG. 1 is a block diagram of an example home network having a set of transcoders that convert data embedded in media content for use by a set of media consumption metering devices.

Referring to FIG. 1, a home network 10 includes a plurality of media consumption devices 12, each representing one of a variety of devices including, for example, a TV, a radio, a personal computer, a personal digital assistant (PDA), a telephone and a digital video disk (DVD) player, a personal video recorder (PVR). Each of the media consumption devices 12 are adapted to receive media content from one or more different media sources collectively represented in FIG. 1 as a media content cloud 14. The content provided by the media content cloud 14 may include, for example, broadcast content, streaming or web content from the Internet, or content supplied by a local device, such as, for example, a DVD player, a video cassette recorder (VCR), a media server or any other local source. The media consumption devices 12 are in communication with each other such that media content transmitted via the home network 10 may be consumed via the media consumption devices 12, may be shared between multiple media consumption devices 12 or may be stored on a media storage database 16, also coupled to the home network 10, for later retrieval and consumption. The home network may be configured in either a wired or wireless manner. In some embodiments, the home network may include a combination of both wired and wireless communication.

To enable audience measurement, a set of content consumption metering devices 18, hereinafter "meters", are also coupled to the home network 10 and are adapted to measure the content consumed by the media consumption devices 12. Each of the meters 18 may be configured to meter a single one of the media consumption devices 12 or may be configured to meter multiple media consumption devices 12. Additionally, each meter 18 may be adapted to operate independently or each may instead be adapted to operate under the control of a master or central metering unit (not shown). The meters 18 may be coupled to the network 10 wirelessly or in a wired fashion. For example, if the meter 18 is implemented as a portable meter to be carried by a household member for purposes of measuring the consumption habits of that household member, then the meter will likely communicate with the network wirelessly. Such communication may be as limited as receiving codes from a media consumption device or may be as robust as two-way communication between the portable meter and other network devices. Audience measurement data collected by each meter 18 is supplied to a measurement collection unit 20 where the data is either analyzed or stored for later transmission to a remote data collection facility (not shown) for analysis. The measurement collection unit 20 may be disposed within the same residence as the home network 10 or may instead be disposed outside of the residence that houses the home network 10. As can be seen in FIG. 1, the meters 18 may be separate from, or integral with, the media consumption devices 12 being metered.

Referring still to FIG. 1, a set of transcoders 22 are coupled to the home network 10 at various locations and are configured to transcode or convert media content transmitted via the home network 10 between one or more formats thereby causing the media content to be suitable for consumption by one or more of the media consumption devices 12. In an example configuration, the transcoders 22 are adapted to receive media content from one or more of the media consumption devices 12, to transcode the media content and to provide the transcoded media content for consumption to one or more of the media consumption devices 12 according to a method described in greater detail below.

A home network media server 24 coupled to and in communication with the home network media storage database 16 may be adapted to control communication on the home network 10, may be adapted to function as a media content consumption device 12 and may be further adapted to receive content from the media cloud 14. The home network media server 24 may provide content to the various devices coupled to the home network 10 by streaming the content, pushing the content, allowing the content to be downloaded or by any other manner. Additionally, the home network media server 24 may act as a central repository for all of the media content that is consumed in the home network 10. Alternatively, the media content may be received at any of the media consumption devices 12 and then supplied to the home network 10 for consumption/viewing/display at any of the other media consumption devices 12.

As will be appreciated by one having ordinary skill in the art, the home network 10 may be configured in any desired manner and may include any number of network devices. Moreover, the devices coupled to the home network 10 may communicate and interface in any desired manner including, for example, using either a wired or wireless communication protocol such as HAVi, Wi-Fi, BlueTooth, IEEE 1394, DVI, HDMI or any other high speed interface protocol or using an Ethernet protocol.

Figure 2:
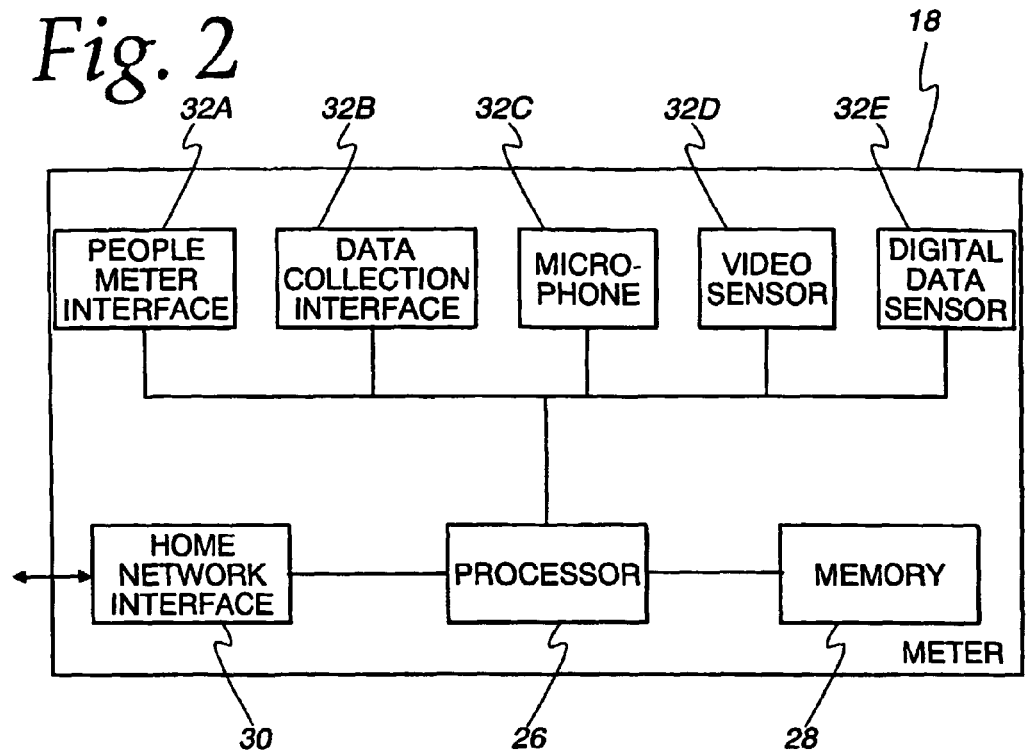
FIG. 2 is a block diagram that depicts an example manner in which the transcoder of FIG. 1 may be implemented.

Referring now to FIG. 2, in an example embodiment, each meter 18 is equipped with a processor 26 which executes a set of instructions stored in a memory 28 to control the operation of the meter 18 and a home network interface 30 that allows communication between the meter 18 and the other devices coupled to the home network 10 and that may be implemented using, for example, a software application program interface (API). As will be appreciated by one having ordinary skill in the art, the home network interface 30 may be implemented using any type of device capable of translating between a communication protocol used by the home network 10 and a communication protocol used by the processor 26 disposed in the meter 18. In addition, each meter 18 includes one or more interfaces 32a, 32b for interfacing with other devices and one or more sensors 32c-32e for sensing media content consumption. The interfaces 32a, 32b may include, for example, an interface 32a adapted to communicate with a people meter that senses the presence of one or more network users/audience members and/or a data collection interface 32b adapted to communicate with the collection measurement unit 20. The sensors 32c-32e supply sensed information to the processor 26 which processes the information and causes the information to be transmitted to the measurement collection unit 20 via the home network 10. The measurement collection unit 20 then transmits the data to a remote data collection facility (not shown) for analysis. In addition, the processor 26 is adapted to respond to queries sent by the transcoder 22 via the home network 10. Alternatively, the measurement collection unit 20 need not be coupled to the home network 10 but may instead be adapted to receive media consumption measurement data directly from the meters 18 via one or more data collection interfaces 32b, disposed in one or more of the meters 18.

The sensors 32c-32e associated with each meter 18 are adapted to sense the type of output signals supplied by a corresponding media consumption device and may be implemented using, for example, a microphone 32c for sensing audio signals, a video sensor 32d for sensing video signals, and/or a digital data sensor 32e for sensing data supplied in a digital bitstream. Due to the plurality of sensor types that may be installed in the meters 18, the meters 18 may be adapted to sense a variety of signals and may be further adapted to recognize and process a variety of codes embedded in such signals. These codes may include video based codes such as closed captioning, automated measurement of lineup (AMOL), interactive television triggers in the vertical blanking interval (VBI) of a traditional NTSC or PAL television signal, imperceptible codes in active analog/digital video, and codes included in the user data of digital video packets, to name a few. In addition, these codes may include inaudible audio codes, auxiliary data codes, digitally compressed audio packets as well as information in digital packets containing program guide information such as PSI, PSIP and A-90 data packets. Such codes may be formatted using existing broadcast standards or may instead be formatted according to standards that are currently being developed or that will be developed in the future such as, for example, the standard recently developed by the BBC and presented to TV-Anytime, the content identifier standard being developed by ATSC called Versioned ISAN (VISAN) and the standard known as AD-ID that was recently defined by the American Association of Advertising Agencies. Instead of, or in addition to, sensing signals containing codes associated with media content, one or more of the sensors may be adapted to receive signals that indicate usage of a computer software application. For example, one or more of the sensors may be adapted to monitor a computer software application that controls access to the database 16 to determine, for example, how often particular media content is being transferred into, or out of, the database 16.

The codes are transmitted as metadata via the media signal. The metadata may include a variety of information associated with the media content, such as, for example, content identification information, source identification information (SID), destination device identification information, distribution channel identification information and/or data and timestamps identifying the creation and/or transmission dates of the media content. Metadata may additionally include signal characteristics such as frequency, format, signal strength, bitrates, frame rates, and sampling frequency, to name a few. The signal format information may be used to transcode the signal from a first format to a second format to enable consumption of the signal at a consumption device that is able to recognize and process the second format.

As will be appreciated by one having ordinary skill in the art, the meters 18 may be implemented using any combination of software and hardware adapted to perform core metering functions such as receiving and processing consumption data and supplying the consumption data to a central data collection facility. As will further be appreciated by one having ordinary skill in the art, existing media consumption metering technology spans from the very simple to the complex. Yet, the present invention is not limited to use with either type of metering technology but instead may be used with a variety of meters 18 having a range of complexity. For example, the meters 18 used with the present invention may be capable of communicating via the home network 10 as well as metering media consumption or the meters 18 may instead be standalone devices that are configured to meter a particular type of media consumed via a particular type of media consumption device 12. In addition, the meters 18 may be implemented as simple, hardware based devices that collect channel tuning information or as more sophisticated, software based devices that perform intelligent data collection and processing functions.

The location of each of the meters 18 within the home network 10 depends on the type of metering to be performed. For example, if the meter 18 is adapted to perform metering by sensing a signal output by one of the media consumption devices 12, such as an audio or video signal, then the meter 18 is typically positioned near that content consumption device 12 so that it may access the signal to be metered. If, instead, the meter 18 is adapted to meter a signal supplied by the transcoder 22, then the meter 18 need not be positioned in close, physical proximity to the media consumption device 12 but must be either proximate to the transcoder 22 or arranged to remotely receive the signal output by the transcoder 22. Of course, in the latter embodiment, the meter 18 detects the flow of signals through the transcoder 22 instead of the consumption of those signals by a media content consumption device 12. Such an arrangement may be especially useful with a meter 18 adapted to detect the flow of signals through the transcoder 22 and having a software application interface (not shown) adapted to query the transcoder 22 about the media content being transcoded.

Figure 3:
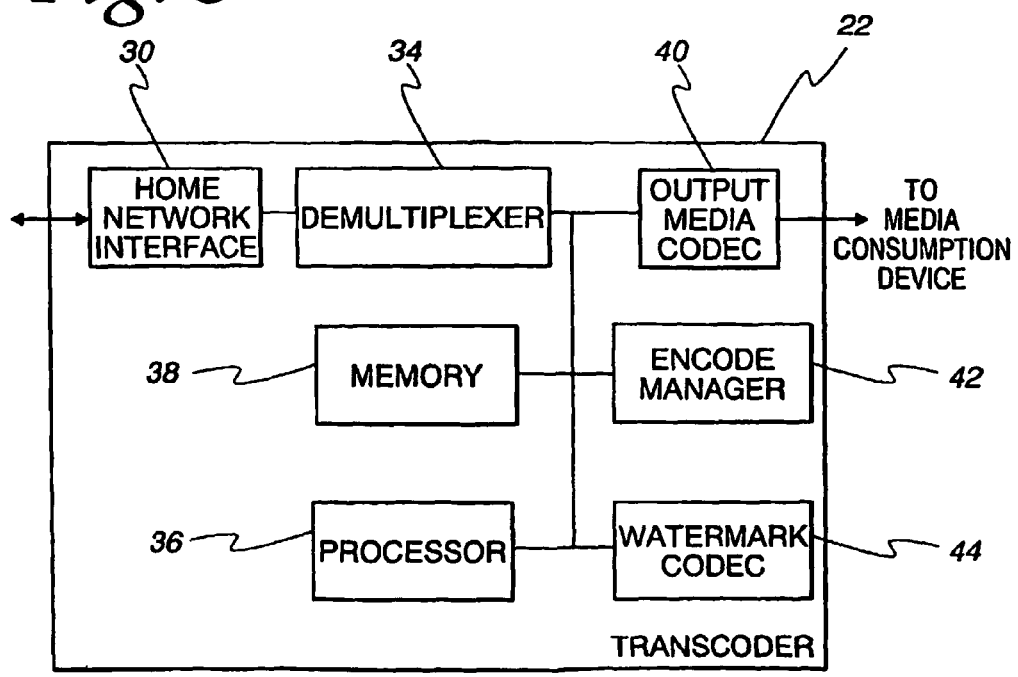
FIG. 3 is a block diagram that depicts an example manner in which one of the media consumption metering devices of FIG. 1 may be implemented.

Referring to FIG. 3, the transcoder 22 of the present invention is adapted to transcode both media content and metadata transmitted with the media content and may be implemented to include a home network interface 30, an input media demultiplexer 34, a processor 36, a memory 38, an output media codec 40, an encode manager 42, and an audio/video watermark codec 44 that is adapted to detect watermarks and to encode new watermarks. The various components included in the transcoder 22 are controlled by the processor 36 which executes a set of software instructions stored in the memory 38 and each transcoder component may be implemented using software, firmware, hardware of any combination thereof. For example, commercially available devices may be used to implement any of the transcoder components provided that the functionality of each device has been modified as needed to operate as described herein. In addition, one or more of the components, such as the encode manager 42, may be implemented as software routines stored in the memory 38 and executed by the processor 36.

Referring also to FIG. 4, the transcoder 22 may be adapted to perform a method 50 that enables the transcoder 22 to transcode media content and accompanying metadata received from a first media consumption device 12 coupled to the home network 10, such as a television, and to supply the transcoded media content and accompanying metadata to a second media consumption device 12, such as a personal computer, also coupled to the home network 10. The method 50 may be performed by the various components of the transcoder 22, as described below, operating under the control of the processor 36 which executes a set of software instructions stored in the memory 38. In an example embodiment, the method 50 may begin when the transcoder 22 receives media content at the home network interface 30 (block 52). The home network interface 30 disposed in the transcoder 22 enables communication between the transcoder 22 and the other devices in the home network 10. As described with respect to the home network interface 30 disposed in the meter 18, the home network interface 30 disposed in the transcoder 22 may be implemented using any type of device capable of translating between the communication protocol used by the home network 10 and the communication protocol used by the processor 36 disposed in the transcoder 22. Also at the block 52, the home network interface 30 stores the media content in the memory 38.

After the media content has been stored in the memory 38, the input media demultiplexer 34 demultiplexes the media content to extract the metadata transmitted therewith (block 54). The media content received at the home network interface 30 need not be stored before being demultiplexed by the demultiplexer 34 but may instead be delivered by the home network interface 30 to the demultiplexer 34 as the media content arrives at the transcoder 22. The demultiplexer 34 may demultiplex the media content as it is received and then cause the demultiplexed content, i.e., the media content and the extracted metadata to be stored in the memory 38. The method 50 may then continue with the encode manager 42 examining the extracted metadata to identify a media format, "Format A", in which the media content was supplied to the transcoder 22 by the television (block 56). For example, the metadata may indicate that the media content received at the transcoder 22 is formatted as a television broadcast signal such that Format A is a standard broadcast television signal format such as, for example, an NTSC signal. In addition, the encode Manager 42 examines the metadata to identify a metadata format, Format A1, in which the metadata extracted from the media content is formatted. In this example embodiment, the transcoder 22 is described as being adapted to examine the incoming media content and metadata to determine the identities of Format A and Format A1. The ability of the transcoder 22 to make such a determination is especially useful for transcoders adapted to receive media content and metadata from a variety of media consumption device types. If, instead, the transcoder 22 is configured within the home network 10 to receive media content and metadata from only a single media consumption device type, then the transcoder 22 may be pre-programmed with the identities of Format A and Format A1 such that the encode manager 42 need not determine the identities of Format A and Format A1 (block 56).

Next, the encode manager determines a media format, "Format B", associated with the second network device to which the transcoded media content shall be delivered for consumption (block 58). By way of example, the personal computer may have a Windows operating system and a Windows media player such that the media content must be supplied to the personal computer in a streaming media format suitable for display via the Windows media player. Thus, for this example, media Format B is a streaming media signal format. The encode manager 42 may be pre-programmed with the media format used by the personal computer, i.e., Format B, such that the encode manager retrieves this format information from the memory 38. Alternatively, the encode manager 42 may be configured to query the personal computer to obtain media Format B. In addition, the encode manager 42 also identifies a metadata format, Format B1, to which the extracted metadata shall be transcoded before delivery to the personal computer (block 58). Format B1 is the metadata format recognized by the meter 18 configured to measure media consumption at the personal computer. The encode manager 42 may be pre-programmed with the identity of the metadata format, Format B1, or the encode manager 42 may be adapted to obtain the identity of Format B1 from the meter 18 associated with the personal computer by performing one or more of a set of querying methods described in greater detail below.

Once the encode manager 42 has identified the applicable media formats, Formats A and B, and the applicable metadata formats, Format A1 and B1, the method continues with the encode manager 42 instructing the output media codec 40 to transcode the media content from Format A to Format B and the extracted metadata from Format A1 to Format B1 and providing the output media codec 40 with the parameters needed to perform such transcoding functions (block 60). In addition, the encode manager 42 supplies the output media codec 40 with instructions and parameters necessary for combining the transcoded metadata with the transcoded media content to form an output media signal for subsequent delivery to the personal computer. Lastly, the transcoded media signal having the transcoded metadata embedded therein is supplied by the transcoder 22 to the personal computer for consumption thereat (block 62).

As will be appreciated by one having ordinary skill in the art, methods for performing transcoding functions that convert a signal from a first media format to a second media format are well known in the art. For example, the transcoder 22 may be adapted to convert a signal containing media content from a broadcast format to any of a 1) streaming media format, 2) JPEG format, e.g., deriving a still picture from a movie for use in a digital photo frame, 3) MP3 format, e.g., playing a soundtrack to a broadcast movie, and/or 4) a digital video recorder format. Alternatively, the transcoder 22 may be adapted to convert a signal from a digital video recorder format to any of a 1) streaming media format, 2) MP3 format, and/or 3) a JPEG format. By way of further example, the transcoder 22 may be adapted to convert a signal from a streaming media format to either of a 1) JPEG format and/or 2) MP3 format. As will further be appreciated by one having ordinary skill in the art, any of these well-known transcoding techniques may be adapted to enable transcoding of the metadata from a first metadata format to a second metadata format.

As will further be appreciated by one having ordinary skill in the art, the metadata formats may be configured in a variety of different ways and, in some instances, the metadata formats may be at least partially dependent on the media format of the media content associated with the metadata. For example, if the media content associated with the metadata is provided in a broadcast television media format, then the metadata format will likely be formatted to include data fields related to broadcast television. Referring now to FIG. 5A, Format A1, if associated with a digital broadcast television media format, such as, for example, ATSC, may include a set of fields 70 for containing a variety of broadcast television signal information such as a minor channel number 72, a major channel number 74, a transport ID 76, a name of a program transmitted in the media content 78, a program number 80, a program description 82, a source ID 84, a date/time stamp 86, a transport rate 88, a video bitrate 90, an audio bitrate 92, an audio sampling rate 94, and a video frame rate 96. In this example, the minor channel number and major channel number are each 10 bits long, the transport ID is 16 bits long, the program name is represented as a sequence of one to seven 16 bit character codes coded in accordance with the Basic Multilingual Plane (BMP) of Unicode™, as specified in ISO 10646-1, the program number is 8 bits long, the program description is represented as a sequence of one to seven 16-bit character codes coded in accordance with the Basic Multilingual Plane (BMP) of Unicode™, as specified in ISO 10646-1, the source ID is 16 bits long, and the date/time stamp is a 32 bit long number in UTC format.

In contrast, metadata associated with media content that is to be supplied in a streaming media format for consumption/display at a personal computer will likely be formatted as a data header including data fields 98 for containing information about the media content in a digital data format. Thus, for example, Format B1 may include fields for containing information such as the program name 100, the program number 102, the program description 104, a source ID 106, a broadcast date/time stamp 108, a transcoded date/time stamp 110, an author 112, a device ID 114, a home ID 116, a format 118, a video bitrate 120, an audio bitrate 122, an audio sampling rate 124, and a video frame rate 126. In addition, the data fields of Format B1 may be defined to include data in a specific code or a data string having a specific number of bits. For example, the fields of Format B1 may be defined such that the program name 100 is ASCII encoded, the program number 102 is 8 bits long, the program description 104 is ASCII encoded, the source ID 106 is identical in format to the source ID of Format A, the broadcast date/time stamp 108 is the same as in the broadcast metadata, the transcoded date/time stamp 110 is a 32 bit number reflecting the date and time of transcoding by transcoder 104, the author field 112 is an ASCII representation of the user of the transcoder 104, the device ID 114 is an 8 bit ASCII encoded number identifying the transcoder 104, and the home ID 116 is a 32 bit ASCII encoded number assigned to identify the home network 10. In addition to identifying Formats A1 and B1, the encode manager 42 may be configured to generate the data contained in one or more of the fields of Format B1 including, for example, the data associated with the author 112, device ID 114, home ID 116 and format 118 fields.

The metadata format, Format B1, may also be affected by the type of meter 18 that will be used to collect the metadata for purposes of measuring consumption of the media content that is associated with the metadata. For example, if the meter 18 is configured to detect audio codes, then the metadata format, Format B1, will be suitable for insertion into an audio signal and recognition by an audio code meter and/or if the meter is configured to detect video codes, then the metadata format, Format B1, will be suitable for insertion into a video signal and recognition by a video code meter. Likewise, if the meter 18 is configured to detect digital data, then the metadata format, Format B1, will be suitable for insertion into a digital data stream and detection by a digital data sensor.

The transcoding capabilities of the transcoder 22 may also vary depending upon the position of the transcoder 22 within the home network 10. For example, if the transcoder 22 is positioned to receive input from multiple media consumption devices 12 and to provide transcoded media content to multiple media consumption devices 12, then the transcoder 22 will likely be adapted to transcode media content between the multiple formats used by the media consumption devices 12 coupled thereto. Alternatively, if the transcoder 22 is positioned to receive input from a single media consumption device 12 and to supply transcoded media content to a single media consumption device 12, then the transcoder 22 need only be adapted to transcode between the media formats used by the two media consumption devices 12 configured to supply/receive media content to/from the transcoder 22.

Figure 6:
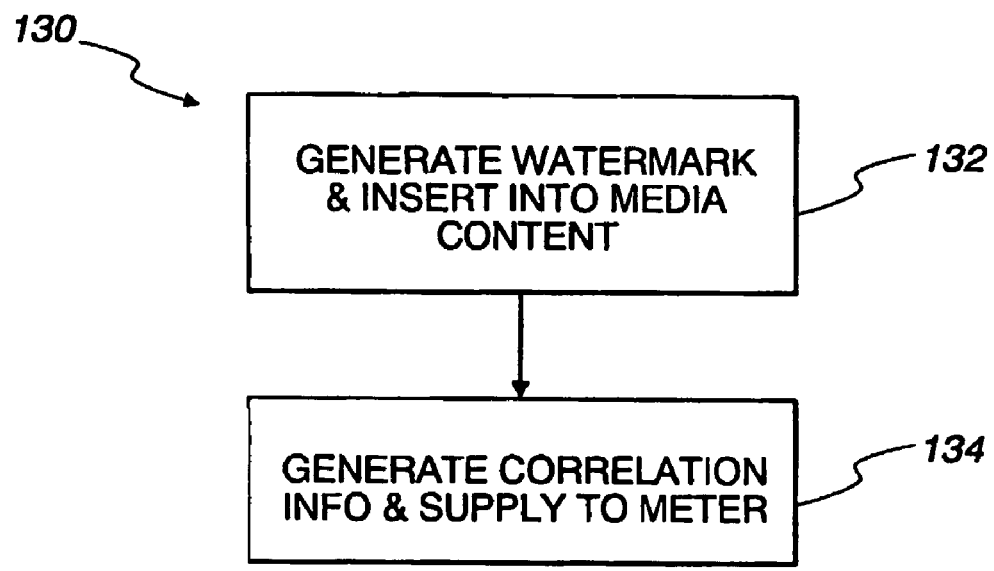
FIG. 6 is a flow chart that depicts an example method for creating a watermark that represents a particular media content and for creating correlation information that may be used to correlate the watermark with the particular media content.

Referring now to FIG. 6, depending on the capabilities of the meter 18 associated with the second network device, e.g., the personal computer, and whether one or more conditions are satisfied, as is described in greater detail below, the method 50 may be expanded to include a submethod, identified generally with reference numeral 130, for causing the audio/video watermark codec 44 to insert a watermark into the media content in a manner that causes the inserted watermark to be imperceptible to the human senses so that the inserted watermark does not interfere with the consumption of the media content at the personal computer. In such an arrangement, the encode manager 42 may use the metadata associated with the media content to identify the media content and then cause the audio/video watermark codec 44 to generate a watermark that uniquely represents that media content and to insert the watermark into the transcoded media content (block 132). Next, the transcoder 22 supplies information that correlates the identity of the media content with the unique watermark to the meter 18 which may be adapted to transmit this correlation information directly to a remote data collection facility (not shown) or via the measurement collection unit 20 (see FIG. 1) (block 122). Alternatively, the transcoder 22 may be adapted to supply this correlation information directly to the measurement collection unit 20 via the home network 10. When the media content having the inserted watermark is consumed at the personal computer, and the meter 18 associated with the personal computer extracts the watermark and reports the presence of the watermark to the measurement collection unit 20 or the remote data collection facility, the data collection facility may use the correlation information to determine the identity of the consumed media content based on the reporting of the unique watermark.

Referring again to FIG. 1, it should be understood that not all of the transcoding functions need to be performed by a single network component but may instead be performed by any of the consumption devices 12, or any other network device or combination of network devices, provided that such devices are adapted to perform the transcoding functions described herein. For example, the transcoder 22 may be configured to demultiplex an incoming media content signal to separate the metadata contained in the signal from the programming or other media content as described with respect to FIGS. 3 and 4. Alternatively, a media consumption device 12 may be configured to perform this demultiplexing function such that the metadata extracted thereby is transmitted to the transcoder 22 separately from the media content. Likewise, any of the media consumption devices 12 may be configured to decode or otherwise process the media content signal before the signal is transmitted to the transcoder 22. For example, any of the media consumption devices 12 may be configured to receive and demodulate/downconvert a digitally compressed broadcast signal provided in an ATSC, DVB or MPEG format via an RF transmission. Any of the media consumption devices 12 may further be configured to include a demultiplexer that demultiplexes the demodulated bitstream to obtain a set of elementary components, including an elementary video stream, an elementary audio stream and the metadata transmitted in the broadcast. The elementary video and audio streams may then be decoded by an MPEG/AC3 audio decoder and an MPEG video decoder, respectively, both of which may also be disposed in any of the media consumption devices 12. The decoded video and audio streams may subsequently be transmitted to the transcoder 22 for transcoding in accordance with the blocks 56-62 of the method 50 shown in FIG. 4 described above. After the transcoding has been performed, the transcoder 22 may be adapted to yield a streaming media signal that may be delivered to one of the media consumption devices 12 configured to consume/display streaming media or may instead be stored in the memory 16 by the server 24 for consumption at a later time. In addition, the meter 18 used to meter the media consumption device 12 at which the streaming media is consumed may be configured to receive the transcoded metadata directly from the transcoder 22 or may instead be configured to extract the transcoded metadata embedded in the streaming media signal delivered by the transcoder 22 as it is consumed by the media consumption device 12.

Referring still to FIG. 1, in an embodiment in which the transcoder 22 supplies the transcoded metadata directly to a first meter 18, the transcoder 22 may be disposed in or in communication with a second meter 18 configured to meter consumption at a media consumption device 12. The second meter 18 may be implemented using, for example, a set top box 18 that is configured to meter consumption of television programming via, for example, a television 12. In this embodiment, the set top box 18 collects metadata as the corresponding television programming is consumed at the television 12. The set top box 18 then supplies the collected metadata to the transcoder 22 which transcodes the metadata from the first format, Format B1, to the second format, Format B2, suitable for delivery to and reception at the first meter 18. The transcoder 22 may be integrated with the set top box 18, disposed within the set top box 18, or separate from but in communication with the set top box 18. The first meter 18 may be implemented using, for example, a portable meter 18 designed to collect audio codes or designed to collect data transmitted wirelessly using any wireless protocol. Of course, if the first meter 18 is designed to receive data wirelessly using a wireless protocol such as Bluetooth, then the transcoder 22 will be configured to transcode the metadata to a Bluetooth format and the second meter 18 will be configured to transmit the data in Bluetooth format. The portable meter 18 may be configured to be carried by a household member for purposes of metering that household member's viewing habits. The portable meter 18 may additionally be configured to meter media consumption by that household member that occurs out of the home by detecting audio codes emitted by media consumption devices 12 disposed outside the home and may be configured to detect media consumption within the home by wireless reception of transcoded metadata from the set top box 18 as described above. Alternatively, the portable meter 18 may be designed to detect audio codes emitted by the television 12 as well as metadata transcoded and transmitted by the set top box 12 such that the portable meter 18 receives two sets of data representing the same viewing event while disposed in the home. These two data sets may then be compared for consistency to increase confidence in the accuracy of the data. Of course, the two data sets must be treated such that the sets are only counted as a single viewing event. In another example embodiment, the set top box 18 may configured to supplement the code capturing capabilities of the portable meter 18 by detecting codes that are not detectable by the portable meter 18, by transcoding such codes to a format suitable for detection by the portable meter 18 and by then supplying the transcoded codes to the portable meter 18. In such an embodiment, the portable meter 18 may be designed to detect a first type of code such as an SID, emitted by the television 12, but not a second type of code, such as a time stamp. The set top meter 18 may be designed to detect either or both of the first and second types of code. For example, the set top meter 18 may detect the SID and the time stamp emitted by the television 12 and may transcode the SID and timestamp to a format suitable for reception/processing by the portable meter 18. Thereafter, the set top meter 18 may transmit one or both of the transcoded time stamp and SID to the portable meter 18 via, for example, radio frequency signals, infra-red signals, Wi-Fi signals, audio signals, etc. Of course, the set top and portable meters 18 will have to be equipped to communicate using such signals.

The transcoder 22 may be pre-programmed with the identity of Format A1 and Format B1 such that the transcoder 22 may automatically convert metadata received at the transcoder from Format A1 to Format B1. In fact, such an arrangement may be preferred when the transcoder 22 is adapted to receive media in a single format only and to transmit data in a single format only. Alternatively, referring also to FIG. 7A, as mentioned above, the transcoder 104 may be adapted to perform a variety of methods to query one or more networked meters 18 for information about the detection capabilities of the meters 18 so that the format in which the metadata is to be supplied to the meters 18, i.e., Format B1, can be determined. For example, one such method 140 may comprise a set of submethods, each submethod designed to test for the presence of a different type of sensor. The first such submethod 142 may test for the presence of an audio sensor capable of sensing audio watermarks and may begin when the transcoder 22 queries the meter 18 to determine whether it includes an audio watermark sensor (block 144). If the meter 18 responds to the query in the negative, i.e., the meter 18 does not have an audio watermark sensor, then the transcoder 22 bypasses the remainder of the submethod 142 and instead proceeds to additional submethods for testing whether the meter 18 includes one or more other types of sensors as described in greater detail below with reference to FIGS. 7B and 7C.

If instead, in response to the query performed at the block 64, the meter 18 responds in the positive, i.e., the meter 18 does have an audio watermark sensor, then the submethod 62 continues with the transcoder 22 determining whether an audio watermark has been detected in the media content supplied to the transcoder 22 for transcoding (block 146). If an audio watermark is not detected in the media content, then the transcoder 22 creates a new audio watermark and causes the new audio watermark to be embedded into the media content (block 148). As will be appreciated by one having ordinary skill in the art, the audio/video watermark codec 44 may be configured to detect the presence of an audio watermark supplied in the media content and to create a new audio watermark for insertion in the content. Moreover, the capabilities and functionality of a standard audio/video watermark codec are well known in the art are not described further herein. The transcoder 22 may also cause all or a portion of the submethod 130, described with respect to FIG. 6, to be performed thereby causing correlation information to be generated and transmitted to the measurement collection unit 20 and/or a remote data collection facility where it may be used to correlate the watermark to the program or other content it represents.

If an audio watermark has been detected at the block 146, then the transcoder 22 determines whether the audio watermark, if inserted into the signal to be output by the transcoder 22, will survive the compression performed by the output media codec 40 (block 150). Specifically, the output media codec 40 is adapted to compress the media content signal having the inserted watermark before the signal is transmitted via the home network 10. The output media codec 40 compresses the signal by suppressing one or more of the signal frequencies. However, watermarks are created by modulating a particular set of signal frequencies in a manner such that the modulated frequencies uniquely represent a particular program or other media content. Thus, the compression performed by the output media codec 40, may cause one or more of the frequencies modulated to create the watermark to be suppressed thereby causing the audio watermark to be unrecoverable by the meter 18. The transcoder 22 may be adapted to perform a variety of methods for determining whether the watermark will survive compression by the output media codec 40. For example, the transcoder 22 may cause the output media codec 40 to insert the watermark into the media content and the resulting signal may be processed by the transcoder 22, in much the same way an input signal would be processed, to determine whether the audio watermark is recoverable. In another embodiment, the transcoder 22 may be pre-programmed with information pertaining to signal compression ratios that the watermark will be able to withstand/survive. Specifically, before inserting a particular watermark into a media content signal, the watermark may be tested to determine a range of suitable signal compression ratios, i.e., compression ratios that the watermark will survive. These suitable ratios may then be provided to the manufacturers/developers of the transcoder 22 and used to pre-program the transcoder 22 so that when watermarks are encountered, the transcoder 22 may use the pre-programmed information to compare to the ratio used by the output media codec 40 to determine whether the compression ratio used by the output media codec 40 is suitable inserting and for transmitting the watermark in a recoverable, distortion-free manner. In a still further embodiment, information about suitable compression ratios may be transmitted with the signal containing the watermark and extracted from the signal by the transcoder 22 for use in determining whether the watermark will survive the compression ratio used by the output media codec 40. If the audio watermark will survive, then the sub method 142 causes the output media codec 40 to insert the watermark (block 152) (if it is not already inserted) after which the submethod 142 is complete and the method 140 continues at another submethod described below with respect to FIG. 7B and FIG. 7C.

If, at the block 150, the transcoder 22 determines that the compression ratio used by the output media codec 40 is not suitable, i.e., will cause the watermark to be unrecoverable, then the transcoder 22 may decrease the compression ratio by a desired amount. As will be understood by one having ordinary skill in the art, the compression ratio refers to the ratio of the data in the uncompressed signal to the data in the compressed signal. In addition, the signal compression ratio is inversely related to the output bit rate, i.e., as the compression ratio decreases, the output bit rate increases. Thus, if the compression ratio is too high and would cause the watermark to be unrecoverable, then the transcoder 22 may decrease the compression ratio of the output media codec 40 by increasing the output bit rate of the output media codec 40 by a desired amount such as, for example, 30 Kb/sec (block 154). After increasing the output bit rate, the transcoder 22 determines whether the new, increased output bit rate exceeds the maximum allowable bit rate supported by the home network 10 (block 156). As will be appreciated by one having ordinary skill in the art, if the bit rate is higher than that supported by the home network 10, then the home network 10 may not be able to carry the signal without causing it to be distorted. As a result, the transcoder 22 decreases the output bit rate to a value that is within the bandwidth of the home network 10 (block 158), and the submethod 142 returns to the block 148 at which a new audio watermark is created and inserted into the media content, as described above. As is also described above, when the transcoder 22 causes the output media codec 40 to create a new audio watermark the transcoder 22 may also perform all or a portion of the submethod 130 shown in FIG. 6, for causing correlation information to be created and transmitted to the meter 18 for reporting to the remote data collection facility (not shown).

If, the output bit rate does not exceed the maximum rate supported by the home network 10 (block 156), then the submethod 142 returns to the block 150, and the blocks subsequent thereto, at which the transcoder 22 again tests to determine whether the codec compression ratio is suitable for transmission of the watermark, as described above.

Figure 7B:
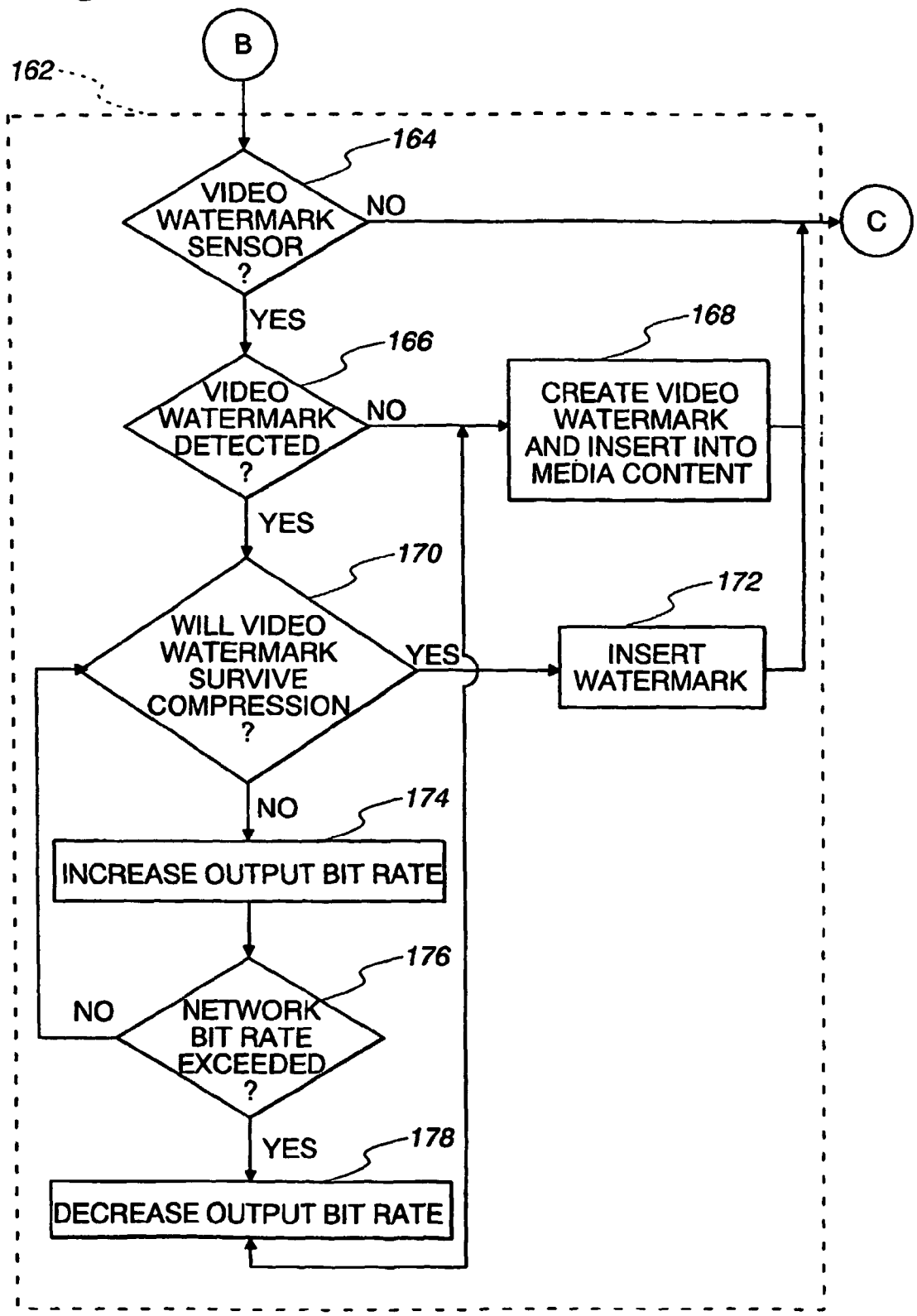

Referring also to FIG. 7B, which includes a continuation of the flow chart of FIG. 7A as indicated by the alignment points A, after performing the submethod 142 for detecting the presence of an audio watermark sensor, a submethod 162 for determining whether the meter has a sensor capable of sensing an video watermark may be performed. The submethod 162 for detecting the presence of a video watermark sensor begins when the transcoder 22 queries the meter 18 to determine whether it includes a video watermark sensor (block 164). If the meter 18 responds to the query in the negative, i.e., the meter 18 does not have a video watermark sensor, then the transcoder 22 proceeds to additional submethods for testing whether the meter includes one or more other types of sensors as described in greater detail below with reference to FIG. 7C. If instead, in response to the query performed at the block 164, the meter 18 responds in the positive, i.e., the meter 18 does have a video watermark sensor, then the submethod 162 continues with the transcoder 22 querying the meter 18 to determine whether a video watermark has been detected in the media content supplied to the transcoder 22 for transcoding (block 166). If a video watermark is not detected in the media content, then the submethod 162 may continue at a block 168 at which the transcoder 22 creates a new video watermark and causes the new video watermark to be inserted into the media content. As discussed above, the capabilities and functionality of a standard audio/video watermark codec are well known in the art and are not described further herein. The transcoder 22 may also cause all or a portion of the submethod 130, described with respect to FIG. 6, to be performed thereby causing correlation information to be generated and transmitted to the measurement collection unit 20 and/or a remote data collection facility (not shown) where it may be used to correlate the watermark to the program or other content it represents.

If a video watermark has been detected at the block 166, then the transcoder 22 determines whether the video watermark, if inserted into the signal to be output by the transcoder 22, will survive the compression performed by the output media codec 40 (block 170). Specifically, the output media codec 40 is adapted to compress the media content signal having the inserted watermark before the signal is transmitted via the home network 10. The output media codec 40 compresses the signal by suppressing one or more of the signal frequencies. However, watermarks are created by modulating a particular set of signal frequencies in a manner such that the modulated frequencies uniquely represent a particular program or other media content. Thus, the compression performed by the output media codec, may cause one or more of the frequencies modulated to create the watermark to be suppressed thereby causing the video watermark to be unrecoverable by the meter 18. The transcoder 22 may be adapted to perform a variety of methods for determining whether the watermark will survive compression by the output media codec 40. For example, the transcoder 22 may cause the output media codec 40 to insert the watermark into the media content and the resulting signal may be processed by the transcoder 22, in much the same way that an input signal is processed, to determine whether the video watermark is recoverable. In another embodiment, the transcoder 22 may be pre-programmed with information pertaining to signal compression ratios that the watermark will be able to withstand/survive. Specifically, before inserting a particular watermark into a media content signal, the watermark may be tested to determine a range of suitable signal compression ratios, i.e., compression ratios that the watermark will survive. These suitable ratios may then be provided to the manufacturers/developers of the transcoder 22 and used to preprogram the transcoder 22 so that when watermarks are encountered, the transcoder 22 may use the pre-programmed information to compare to the compression ratio of the output media codec 40 to determine whether the compression ratio used by the output media codec 40 is suitable for inserting and transmitting the watermark in a recoverable, distortion-free manner. In a still further embodiment, information about suitable compression ratios may be transmitted with the signal containing the watermark and extracted from the signal by the transcoder 22 for use in determining whether the watermark will survive the compression ratio used by the output media codec 40. If the video watermark will survive compression, the submethod 162 causes the output media codec 40 to insert the watermark (block 172) into the media content (if it is not already inserted) after which the submethod 162 is complete and the method 140 continues at another submethod described below with respect to FIG. 7B and FIG. 7C.

If, at the block 170, the transcoder 22 determines that the compression ratio of the output media codec 40 is not suitable, i.e., will cause the watermark to be unrecoverable, then the transcoder 22 may decrease the compression ratio by a desired amount. As will be understood by one having ordinary skill in the art, the compression ratio refers to the ratio of the quantity of data in the uncompressed signal to the quantity of data in the compressed signal. In addition, the signal compression ratio is inversely related to the output bit rate, i.e., as the compression ratio decreases, the output bit rate increases. Thus, if the compression ratio is too high and would cause the watermark to be unrecoverable, then the transcoder 22 may decrease the compression ratio of the output media codec 40 by increasing the output bit rate of the output media codec 40 by a desired amount such as, for example, 30 Kb/sec (block 174). After increasing the output bit rate, the transcoder 22 determines whether the new, increased output bit rate exceeds the maximum allowable bit rate supported by the home network 10 (block 176). As will be appreciated by one having ordinary skill in the art, if the bit rate is higher than that supported by the home network 10, then the home network 10 may not be able to carry the signal without causing it to be distorted. As a result, the transcoder 22 decreases the output bit rate to a value that is within the bandwidth of the home network 10 (block 178), and the submethod 162 returns to the block 168 at which a new video watermark is created for insertion into the media content, as described above. As is also described above, the block 168 at which the transcoder 22 causes the output media codec 40 to create a new video watermark may also include all or a portion of the submethod 130 shown in FIG. 6, for causing correlation information to be created and transmitted to the meter 18 for reporting to the remote data collection facility (not shown).

If, at the block 176, the output bit rate does not exceed the maximum rate supported by the home network 10, then the submethod 162 returns to the block 170, and the blocks subsequent thereto, at which the transcoder 22 again tests to determine whether the codec compression ratio is suitable for transmission of the watermark, as described above.

In addition to testing for the presence of an audio watermark sensor and a video watermark sensor, the transcoder 22 may be adapted to query the 18 meter to determine whether it includes other types of sensors as well, such as digital sensors, database sensors and/or software sensors. Specifically, with reference also to FIG. 7C which includes a continuation of the flow chart of FIGS. 7A and 7B as indicated by the alignment points B, such a submethod 200 may begin with the transcoder 22 querying the meter 18 to determine whether it includes a sensor capable of parsing a digital bitstream to decode metadata embedded in the stream (block 202). If the meter 18 responds that it does include such a digital sensor, then the transcoder 22 causes the output media codec 40 to encode the metadata received with the media content into the desired format (block 204) and to digitally insert the encoded metadata into the bitstream of the transcoded media content to be output by the transcoder (block 206).

If the meter 18 indicates that it does not include a digital sensor (block 202), then the method continues at a submethod 210 at which the transcoder 22 queries the meter 18 to determine whether it includes a database sensor, i.e., a sensor that can identify when media content is being read from a media database (block 212). If such a database sensor is present, then the submethod 200 continues with the transcoder 22 transcoding the metadata, embedding the transcoded metadata in the transcoded media content and then causing the media content to be stored in a media database (block 214).

If, at the block 212, a database meter is not detected, then the method continues at a submethod 216 for determining whether the meter 18 includes a software sensor adapted to extract metadata from a media consumption device using software APIs associated with the consumption device, e.g. DASE/MHP API (block 218). If such a software sensor is detected, then the transcoder 22 causes the output media codec 40 to format the metadata in a manner suitable for extraction by the software sensor and to embed the metadata into the transcoded media signal that is output by the transcoder 22 (block 220).

If a software sensor is not detected, then the transcoder 22 may query the home network 10 for the presence of other meters 18 that are configured to meter the consumption device to which the transcoder 22 supplies transcoded media content (block 222). If another meter 18 is detected, then the transcoder 22 may return to the beginning of the method 140 and cause it to be performed again with respect to the newly detected meter 18. If another meter is not detected, then the transcoder 22 may forego repeating the method 140.

As described, the method 140 for querying a meter 18 to determine the sensing capabilities of the meter 18 actually comprises a set of sub-methods each adapted to query the meter 18 for a specific type of sensor. Although the submethods are described as being performed in a specific order, the sub-methods may actually be performed in any desired order. Likewise, the submethods may be performed in parallel instead of serially. In addition, the transcoder 22 need not be configured to perform all of the submethods of FIGS. 7A-7C but may instead be configured to perform any combination of a subset of these sub-methods. Moreover, the transcoder 22 may be configured to perform any number of additional submethods as necessary to determine the sensing capabilities of the meter 18 so that the metadata may be formatted accordingly.

The querying methods described above need not be performed at all if the transcoder 22 is pre-programmed with information about the sensing capabilities of the meter 18. In such an embodiment, the meters 18 need not be capable of communicating via the home network 10 and need not even be coupled to the home network 10. Instead, the meters 18 need only be capable of metering consumption at a media consumption device 12.

Depending on whether frequent changes to the configuration of the home network 10 are anticipated, the transcoder 22 may be adapted to perform the method 140 every time new media content is received or only a single time, e.g., upon installing the transcoder 22 in the home network 10. Alternatively, the transcoder 22 may be adapted to query for sensor types only after the home network 10 has been reconfigured. Of course, all or portions of the submethods 142 and 162 for detecting the presence of an audio watermark sensor and a video watermark sensor, respectively, may need to be performed every time media content is supplied since at least portions of the submethods 142 and 162 operate to test for the presence of an audio watermark or a video watermark supplied with the media content.

The submethods of FIGS. 7A, 7B and 7C are described as including blocks at which the transcoder 22 determines whether a particular type of sensor is detected and, if such a sensor type is detected, then causes the metadata to be transcoded in a manner suitable for detection by that sensor type, and then proceeds to perform tests for a different type of sensor. However, the submethods may instead be structured such that the transcoder first detects the presence (or absence) of each type of sensor and then, after each sensor type has been detected, causes the metadata to transcoded in a manner suitable for the detected sensor types. In addition, the metadata may be transcoded into more than one metadata format thereby enabling detection by more than one type of sensor.

As described herein, the media content and its corresponding metadata received at the transcoder 22 are stored in the memory device 38 and accessed by the various transcoder components for purposes of transcoding the media content and metadata. Instead, the transcoder 22 may include a plurality of memory devices arranged as registers associated with the various components of the transcoder 22 between which the data may be transferred. Alternatively, the transcoders 22 may be adapted to process and store the media content and metadata in any desired manner.

The home network 10, although described as being disposed within a home residence, may instead be disposed at any type of location and may be configured to enable communication between network devices located at any number of different locations. For example, the home network 10 may be installed in a place of business or at any public location. Any network that enables communication between multiple media consumption devices is sufficient to qualify as a "home network," as that term is used herein.

As will be appreciated by one having ordinary skill in the art, if the consumption device 12 is metered using only a single meter 18 and that single meter 18 is limited to signature sensing only, then any metadata extracted from the media content need not be transcoded at the transcoder 22 because signature metering involves capturing signal characteristic information, i.e., signature information, and does not involve the extraction of codes. Thus, the querying method 60 of FIGS. 7A-7C does not illustrate querying for the presence of a signature sensor. Or, as is more often the case, a consumption device 12 may be metered using multiple meters, one of which is capable of sensing signatures. In a system configured in this manner, metadata transcoding will likely be required as signature sensing is more often used as a back up sensing mechanism instead of a primary sensing mechanism. Thus, the transcoders 22 will not typically be configured to forego metadata transcoding functions upon the detection of a meter 18 having signature sensing capabilities.

The transcoder 22 may additionally be adapted to query the media content consumption device 12 that supplies media content to the transcoder 22 for identification purposes such as, for example, device type and/or model information and the transcoder 22 may then transmit this identifying information to the meter 18 configured to measure consumption at the media consumption device to which the transcoder delivers the transcoded media content.

While the present invention has been described with respect to several embodiments, it is to be understood that the invention is not limited to these disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for a transcoder to transcode metadata included in a media signal conveyed via a home network from a first media format associated with a first media consumption device to a second media format detectable by a media metering device configured to meter a second media consumption device, the method comprising:
    extracting the metadata from the media signal using the transcoder to form extracted metadata;
    querying the media metering device via the home network to determine a sensing capability of the media metering device to sense a media output signal from the second media consumption device communicatively coupled to the home network, wherein the media metering device is to collect audience measurement data associated with the second media consumption device;
    identifying the second media format based on the determined sensing capability of the media metering device, the second media format detectable by the media metering device;
    converting the extracted metadata from the first media format associated with the first media consumption device communicatively coupled to the home network to the identified second media format detectable by the media metering device to form converted media information; and
    sending the converted media information to at least one of the second media consumption device or the media metering device via the home network.

2. A method as defined in claim 1, further comprising converting media content associated with the media signal from a third media format to a fourth media format to form the converted media information.

3. A method as defined in claim 1, further comprising identifying the first media format prior to converting the extracted metadata.

4. A method as defined in claim 1, wherein identifying the second media format comprises identifying at least one of an audio watermark sensor, a video watermark sensor, a digital bitstream sensor, a database sensor, or a software sensor associated with the media metering device.

5. A method as defined in claim 1, wherein converting the extracted metadata from the first media format to the second media format to form the converted media information comprises:
    detecting a watermark associated with the media signal;
    identifying a signal compression ratio associated with the watermark; and
    modifying the signal compression ratio based on the second media format.

6. A method as defined in claim 5, wherein modifying the signal compression ratio based on the second media format comprises comparing an output bit rate associated with the signal compression ratio to a network bit rate associated with the home network.

7. A method as defined in claim 5, wherein modifying the signal compression ratio based on the second media format comprises changing an output bit rate based on a network bit rate associated with the home network.

8. A method as defined in claim 1, wherein converting the extracted metadata from the first media format to the second media format to form the converted media information comprises:
    generating a watermark based on the second media format; and
    inserting the watermark in the converted media information.

9. A method as defined in claim 8 further comprising providing correlation information associated with the watermark and the converted media information to at least one of a data measurement collection device or a data collection facility.

10. A method as defined in claim 1, wherein converting the extracted metadata from the first media format to the second media format to form the converted media information comprises:
    encoding the extracted metadata in the second media format; and
    digitally inserting encoded metadata into a bitstream associated with the converted media information.

11. A method as defined in claim 1, wherein converting the extracted metadata from the first media format to the second media format to form the converted media information comprises converting the extracted metadata to cause converted media content to be stored in a database.

12. A method as defined in claim 1, wherein converting the extracted metadata from the first media format to the second media format to form the converted media information comprises converting the extracted metadata to cause converted metadata to be extracted from the second media consumption device based on an application program interface associated with the second media consumption device.

13. A method as defined in claim 1, wherein extracting the metadata from the media signal comprises demultiplexing the media signal.

14. A method as defined in claim 1 further comprising generating a converted media signal having the converted media information, wherein the converted media information includes at least one of converted media content and converted metadata associated with the converted media content.

15. A method as defined in claim 1, further comprising monitoring media consumption based on the converted media information.

16. A method as defined in claim 1, wherein the metadata comprises at least one of content identification information, source identification information, destination device identification information, distribution channel identification information, timestamps associated with at least one of creation and generation of media content, or information associated with the media signal.

17. A method as defined in claim 16, wherein the information associated with the media signal comprises at least one of frequency information, format information, signal strength information, bit rate information, frame rate information, or sampling frequency information.

18. A method as defined in claim 1, wherein at least one of the first media consumption device or the second media consumption device is one of a television, a radio, a personal computer, a personal digital assistant, a telephone, a digital video disk player, or a personal video recorder.

19. A method as defined in claim 1, wherein the home network comprises at least one of a wired network or a wireless network.

20. A method as defined in claim 1, wherein the home network comprises at least one of a server, a database, or a data measurement collection device.

21. An apparatus for transcoding a media signal conveyed via a home network comprising:
 a network interface to communicate the media signal between a first media consumption device and a second media consumption device configurable to be communicatively coupled to the home network;
 an extracting device coupled to the network interface and configured to extract metadata from the media signal to form extracted metadata;
 an encoding device coupled to the network interface and configured to query a media metering device via the home network to determine a sensing capability of the media metering device to sense a media output signal from the second media consumption device, wherein the media metering device is to collect audience measurement data associated with the second media consumption device, and
 an identification device to identify a second media format based on the determined sensing capability of the media metering device, the second media format detectable by the media metering device, wherein the encoding device is to convert the extracted metadata from a first media format associated with the first media consumption device to the identified second media format detectable by the media metering device to form converted media information.

22. An apparatus as defined in claim 21, wherein the encoding device is configured to convert media content associated with the media signal from a third media format to a fourth media format to form the converted media information.

23. An apparatus as defined in claim 21 wherein the identification device is coupled to the network interface and configured to identify the first media format.

24. An apparatus as defined in claim 21, wherein the identification device is configured to identify at least one of an audio watermark sensor, a video watermark sensor, a digital bitstream sensor, a database sensor, or a software sensor associated with the media metering device.

25. An apparatus as defined in claim 21, wherein the identification device is configured to detect a watermark associated with the media signal and to identify a signal compression ratio associated with the watermark, and wherein the encoding device is configured to modify the signal compression ratio based on the second media format.

26. An apparatus as defined in claim 25, wherein the encoding device is configured to compare an output bit rate associated with the signal compression ratio to a network bit rate of the home network and adjust the output bit rate based on the network bit rate.

27. An apparatus as defined in claim 21, wherein the identification device and the encoding device are integrated within a single device.

28. An apparatus as defined in claim 21 further comprising a watermark generator configured to generate a watermark based on the second media format and insert the watermark in the converted media information.

29. An apparatus as defined in claim 28, wherein the watermark generator is configured to provide correlation information associated with the watermark and the converted media information to at least one of a data measurement collection device or a data collection facility.

30. An apparatus as defined in claim 21, wherein the encoding device is configured to encode the metadata in the second media format and to digitally insert encoded metadata into a bitstream associated with the converted media information.

31. An apparatus as defined in claim 21, wherein the converted media information is configured to cause converted media content to be stored in a database.

32. An apparatus as defined in claim 21, wherein the converted media information is configured to cause converted metadata to be extracted from the second media consumption device based on an application program interface associated with the second media consumption device.

33. An apparatus as defined in claim 21, wherein the encoding device is configured to generate a converted media signal having the converted media information, and wherein the converted media information includes at least one of converted media content or converted metadata associated with the converted media content.

34. An apparatus as defined in claim 21, wherein the network interface is configured to transmit a converted media signal having the converted media information to at least one of the second media consumption device or the media metering device associated with the second media consumption device, and wherein the converted media information includes at least one of converted media content or converted metadata associated with the converted media content.

35. An apparatus as defined in claim 21, wherein the network interface is configured to receive the media signal from the first media consumption device.

36. An apparatus as defined in claim 21, wherein the extracting device comprises a demultiplexer.

37. An apparatus as defined in claim 21 further comprising a memory to store the media signal.

38. An apparatus as defined in claim 1, wherein the metadata comprises at least one of content identification information, source identification information, destination device identification information, distribution channel identification information, timestamps associated with at least one of creation and generation of media content, or information associated with the media signal.

39. An apparatus as defined in claim 38, wherein the information associated with the media signal comprises at least one of frequency information, format information, signal strength information, bit rate information, frame rate information, or sampling frequency information.

40. An apparatus as defined in claim 1, wherein at least one of the first media consumption device or the second media consumption device is one of a television, a radio, a personal computer, a personal digital assistant, a telephone, a digital video disk player, or a personal video recorder.

41. An apparatus as defined in claim 1, wherein the home network comprises at least one of a wired network or a wireless network.

42. An apparatus as defined in claim 1, wherein the home network comprises at least one of a server, a database, or a data collection measurement device.

43. An apparatus as defined in claim 21 integrated with at least one of a set top box, the first media consumption device, the second media consumption device, or a metering device associated with at least one of the first media consumption device or the second media consumption device.

44. A tangible machine accessible medium having machine-readable instructions stored thereon that, when executed by a machine, cause the machine to:
  extract metadata from a media signal conveyed via a home network to form extracted metadata;
  query a media metering device via the home network to determine a sensing capability of the media metering device to sense a media output signal from the second media consumption device communicatively coupled to the home network, wherein the media metering device is to collect audience measurement data associated with the second media consumption device;
  identify a second media format based on the determined sensing capability of the media metering device, the second media format detectable by the media metering device;
  convert the extracted metadata from a first media format associated with a first media consumption device communicatively coupled to the home network to the identified second media format detectable by the media metering device to form converted media information; and
  send the converted media information to at least one of the second media consumption device or the media metering device via the home network.

45. A tangible machine accessible medium as defined in claim 44, wherein the instructions, when executed, cause the machine to convert media content associated with the media signal from a third media format to a fourth media format to form the converted media information.

46. A tangible machine accessible medium as defined in claim 44, wherein the instructions, when executed, cause the machine to identify the first media format prior to converting the extracted metadata.

47. A tangible machine accessible medium as defined in claim 44, wherein the instructions, when executed, cause the machine to identify the second media format by identifying at least one of an audio watermark sensor, a video watermark sensor, a digital bitstream sensor, a database sensor, or a software sensor associated the media metering device.

48. A tangible machine accessible medium as defined in claim 44, wherein the instructions, when executed, cause the machine to convert the extracted metadata from the first media format to the second media format to form the converted media information by:
  detecting a watermark associated with the media signal;
  identifying a signal compression ratio associated with the watermark; and
  modifying the signal compression ratio based on the second media format.

49. A tangible machine accessible medium as defined in claim 48, wherein the instructions, when executed, cause the machine to modify the signal compression ratio based on the second media format by comparing an output bit rate associated with the signal compression ratio to a network bit rate associated with the home network.

50. A tangible machine accessible medium as defined in claim 48, wherein the instructions, when executed, cause the machine to modify the signal compression ratio based on the second media format by changing an output bit rate based on a network bit rate associated with the home network.

51. A tangible machine accessible medium as defined in claim 44, wherein the instructions, when executed, cause the machine to convert the extracted metadata from the first media format to the second media format to form the converted media information by:
  generating a watermark based on the second media format; and
  inserting the watermark in the converted media information.

52. A tangible machine accessible medium as defined in claim 51, wherein the instructions, when executed, cause the machine to provide correlation information associated with the watermark and the converted media information to at least one of a data measurement collection device or a data collection facility.

53. A tangible machine accessible medium as defined in claim 44, wherein the instructions, when executed, cause the machine to convert the extracted metadata from the first media format to the second media format to form the converted media information by:
  encoding the metadata in the second media format; and
  digitally inserting encoded metadata into a bitstream associated with the converted media information.

54. A tangible machine accessible medium as defined in claim 44, wherein the instructions, when executed, cause the machine to convert the extracted metadata from the first media format to the second media format to form the converted media information by converting the extracted metadata to cause converted media content to be stored in a database.

55. A tangible machine accessible medium as defined in claim 44, wherein the instructions, when executed, cause the machine to convert the extracted metadata from the first media format to the second media format to form the converted media information by converting the extracted metadata to cause converted metadata to be extracted from the second media consumption device based on an application program interface associated with the second media consumption device.

56. A tangible machine accessible medium as defined in claim 44, wherein the instructions, when executed, cause the machine to extract the metadata from the media signal by demultiplexing the media signal.

57. A tangible machine accessible medium as defined in claim 44, wherein the instructions, when executed, cause the machine to generate a converted media signal having the converted media information, and wherein the converted media information includes at least one of converted media content or converted metadata associated with the converted media content.

58. A tangible machine accessible medium as defined in claim 44, wherein the instructions, when executed, cause the machine to transmit a converted media signal having the converted media information to at least one of the second media consumption device or the media metering device associated with the second media consumption device, and wherein the converted media information includes at least one of converted media content or converted metadata associated with the converted media content.

59. A tangible machine accessible medium as defined in claim 44, wherein the instructions, when executed, cause the machine to monitor media consumption based on the converted media information.

60. A tangible machine accessible medium as defined in claim 44, wherein the metadata comprises at least one of content identification information, source identification information, destination device identification information, distribution channel identification information, timestamps associated with at least one of creation and generation of media content, or information associated with the media signal.

61. A tangible machine accessible medium as defined in claim 60, wherein the information associated with the media signal comprises at least one of frequency information, format information, signal strength information, bit rate information, frame rate information, or sampling frequency information.

62. A tangible machine accessible medium as defined in claim 44, wherein at least one of the first media consumption device or the second media consumption device is one of a television, a radio, a personal computer, a personal digital assistant, a telephone, a digital video disk player, or a personal video recorder.

63. A tangible machine accessible medium as defined in claim 44, wherein the home network comprises at least one of a wired network or a wireless network.

64. A tangible machine accessible medium as defined in claim 44, wherein the home network comprises at least one of a server, a database, or a data measurement collection device.

65. A system for transcoding a media signal conveyed via a home network comprising:
  a first media consumption device communicatively coupled to the home network;
  a second media consumption device communicatively coupled to the first media consumption device and the home network;
  a media metering device communicatively coupled to the second media consumption device to collect audience measurement data associated with the second media consumption device; and
  a transcoding device communicatively coupled to at least one of the first media consumption device, the second media consumption device, or the media metering device, and configured to:
    extract metadata from the media signal to form extracted metadata;
    query the media metering device via the home network to determine a sensing capability of the media metering device to sense a media output signal from the second media consumption device;
    identify a second media format based on the determined sensing capability of the media metering device, the second media format detectable by the media metering device; and
    convert the extracted metadata from a first media format associated with the first media consumption device to the identified second media format detectable by the media metering device to form converted media information.

66. A system as defined in claim 65, wherein the transcoding device is configured to convert media content associated with the media signal from a third media format to a fourth media format to form the converted media information.

67. A system as defined in claim 65, wherein the transcoding device is configured to identify the first media format prior to converting the extracted metadata.

68. A system as defined in claim 65, wherein the transcoding device is configured to configured to identify at least one of an audio watermark sensor, a video watermark sensor, a digital bitstream sensor, a database sensor, or a software sensor associated with the media metering device.

69. A system as defined in claim 65, wherein the transcoding device is configured to detect a watermark associated with the media signal, to identify a signal compression ratio associated with the watermark, and to modify the signal compression ratio based on the second media format.

70. A system as defined in claim 69, wherein the transcoding device is configured to compare an output bit rate associated with the signal compression ratio to a system bit rate of the system and adjust the output bit rate based on the system bit rate.

71. A system as defined in claim 69, wherein the transcoding device is configured to change an output bit rate based on a network bit rate associated with the home network.

72. A system as defined in claim 65, wherein the transcoding device is configured to generate a watermark based on the second media format and insert the watermark in the converted media information.

73. A system as defined in claim 72, wherein the transcoding device is configured to provide correlation information associated with the watermark and the converted media information to at least one of a data measurement collection device or a data collection facility.

74. A system as defined in claim 65, wherein the transcoding device is configured to encode the extracted metadata in the second media format and digitally insert encoded metadata into a bitstream associated with the converted media information.

75. A system as defined in claim 65, wherein the converted media information causes converted media content to be stored in a database.

76. A system as defined in claim 65, wherein the converted media information causes converted metadata to be extracted from the second media consumption device based on an application program interface associated with the second media consumption device.

77. A system as defined in claim 65, wherein at least one of the first media consumption device or the media metering device is configured to extract the metadata from the media signal.

78. A system as defined in claim 65, wherein the transcoding device is configured to generate a converted media signal having the converted media information, and wherein the converted media information includes at least one of converted media content or converted metadata associated with the converted media content.

79. A system as defined in claim 65, wherein the transcoding device is configured to transmit a converted media signal having the converted media information to at least one of the second media consumption device or the media metering device, and wherein the converted media information includes at least one of converted media content or converted metadata associated with the converted media content.

80. A system as defined in claim 65, wherein the media metering device is configured to monitor media consumption based on the converted media information.

81. A system as defined in claim 65, wherein the metadata comprises at least one of content identification information, source identification information, destination device identification information, distribution channel identification information, timestamps associated with at least one of creation and generation of media content, or information associated with the media signal.

82. A system as defined in claim 81, wherein the information associated with the media signal comprises at least one of frequency information, format information, signal strength information, bit rate information, frame rate information, or sampling frequency information.

83. A system as defined in claim 65, wherein the transcoding device is coupled to at least one of the first media consumption device, the second media consumption device, or the media metering device via at least one of a wired network or a wireless network.

84. A system as defined in claim 65, wherein at least one of the first media consumption device or the second media consumption device is one of a television, a radio, a personal computer, a personal digital assistant, a telephone, a digital video disk player, or a personal video recorder.

85. A system as defined in claim 65, wherein the transcoding device is integrated with at least one of the first media consumption device, the second media consumption device, or the media metering device.

86. A system as defined in claim 65, wherein the media metering device is integrated with at least one of the first media consumption device or the second media consumption device.

87. A system as defined in claim 65 further comprising a server, a database, and a data measurement collection device.

88. An apparatus for transcoding metadata included in a media signal conveyed via a home network from a first media format associated with a first media consumption device to a second media format detectable by a media metering device configured to meter a second media consumption device, the apparatus comprising:
means for extracting the metadata from the media signal to form the extracted metadata;
means for querying the media metering device via the home network to determine a sensing capability of the media metering device to sense a media output signal from the a second media consumption device communicatively coupled to the home network, wherein the media metering device is to collect audience measurement data associated with the second media consumption device;
means for identifying the second media format based on the determined capability of the media metering device, the second media format detectable by the media metering device;
means for converting the extracted metadata from the first media format associated with the first media consumption device communicatively coupled to the home network to the identified second media format detectable by the media metering device to form converted media information; and
means to send the converted media information to at least one of the second media consumption device or the media metering device via the home network.

89. An apparatus as defined in claim 88, wherein the means for converting is configured to convert media content associated with the media signal from a third media format to a fourth media format to form the converted media information.

90. An apparatus as defined in claim 88, wherein the means for converting comprises means for identifying the first media format prior to converting the extracted metadata.

91. An apparatus as defined in claim 88, wherein the means for identifying is configured to identify at least one of an audio watermark sensor, a video watermark sensor, a digital bitstream sensor, a database sensor, or a software sensor associated with the media metering device.

92. An apparatus as defined in claim 88, wherein the means for converting comprises:
means for detecting a watermark associated with the media signal;
means for identifying a signal compression ratio associated with the watermark; and
means for modifying the signal compression ratio based on the second media format.

93. An apparatus as defined in claim 92, wherein the means for modifying is configured to compare an output bit rate associated with the signal compression ratio to a network bit rate associated with the home network.

94. An apparatus as defined in claim 92, wherein the means for modifying is configured to change an output bit rate based on a network bit rate associated with the home network.

95. An apparatus as defined in claim 88, wherein the means for converting comprises:
means for generating a watermark based on the second media format; and
means for inserting the watermark in the converted media information.

96. An apparatus as defined in claim 95 further comprising means for providing correlation information associated with the watermark and the converted media information to at least one of a data measurement collection device or a data collection facility.

97. An apparatus as defined in claim 88, wherein the means for converting comprises:
means for encoding the metadata in the second media format; and
means for digitally inserting encoded metadata into a bitstream associated with the converted media information.

98. An apparatus as defined in claim 88, wherein the means for converting is configured to convert the metadata to cause converted media content to be stored in a database.

99. An apparatus as defined in claim 88, wherein the means for converting is configured to convert the metadata to cause converted metadata to be extracted from the second media consumption device based on an application program interface associated with the second media consumption device.

100. An apparatus as defined in claim 88 further comprising means for generating a converted media signal having the converted media information, wherein the converted media information includes at least one of converted media content and converted metadata associated with the converted media content.

* * * * *